Aug. 15, 1972   H. M. ARNESON   3,684,460
SWIMMING POOL CHLORINATOR
Filed Nov. 25, 1970
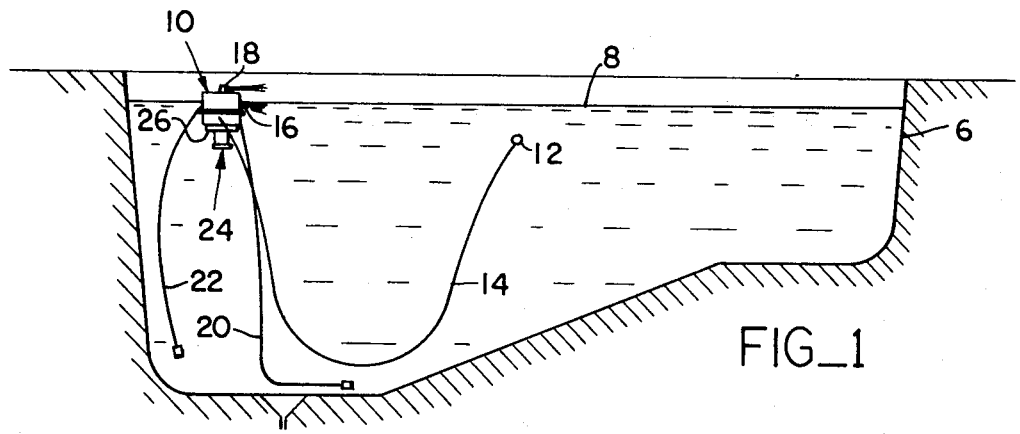
FIG_1
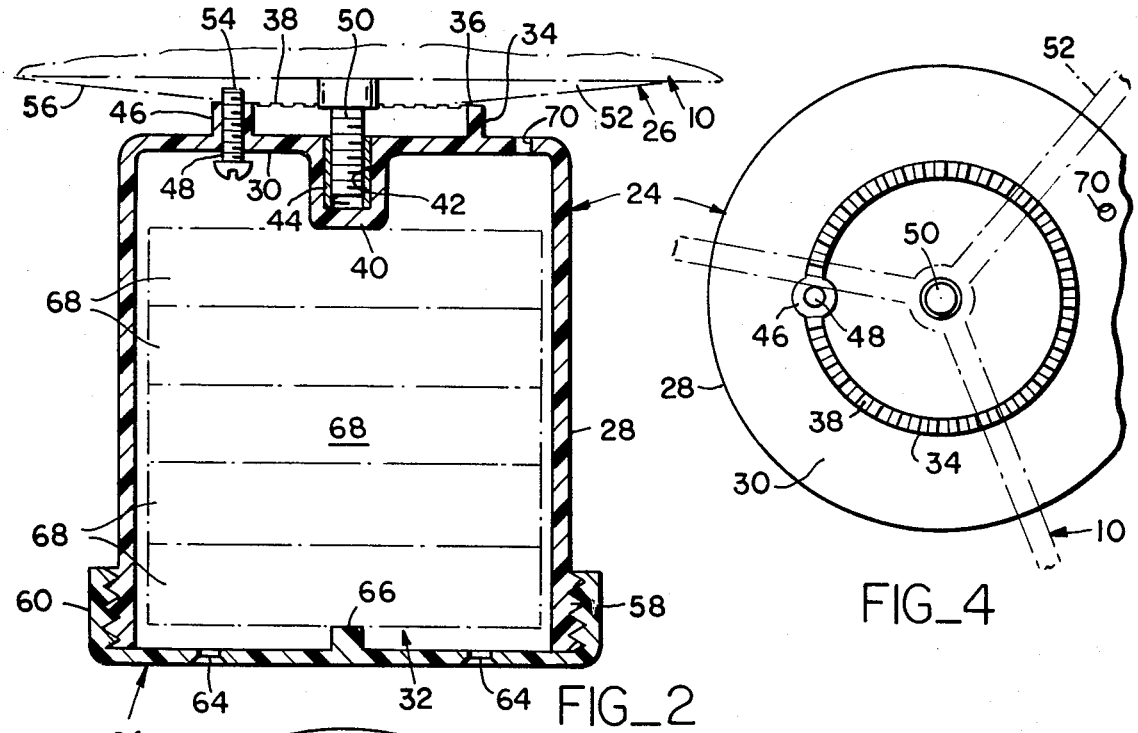
FIG_2   FIG_4
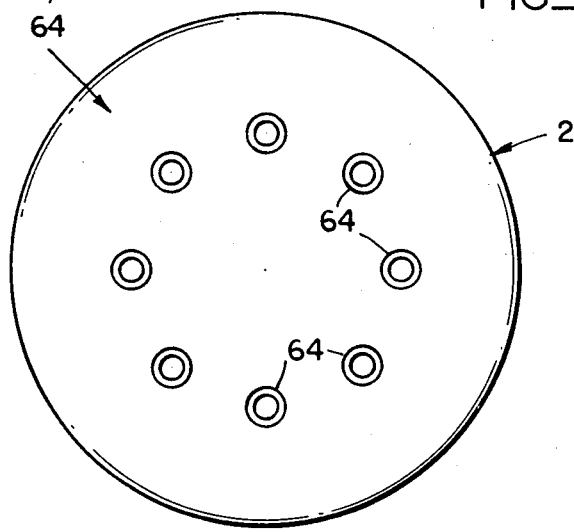
FIG_3
INVENTOR.
HOWARD M. ARNESON
BY
*Townsend and Townsend*
ATTORNEYS United States Patent Office 3,684,460
Patented Aug. 15, 1972

3,684,460
SWIMMING POOL CHLORINATOR
Howard M. Arneson, San Rafael, Calif., assignor to
Arneson Products, Inc., San Rafael, Calif.
Filed Nov. 25, 1970, Ser. No. 92,621
Int. Cl. B01f 3/12
U.S. Cl. 23—267 A    7 Claims

ABSTRACT OF THE DISCLOSURE

A chlorinator for swimming pools defined by a downwardly opening receptacle closed with a removable cover having a plurality of apertures permitting a fluid exchange between the receptacle interior and exterior. Solid chlorine pellets are in the receptacle. The receptacle is mounted to the underside of a swimming pool cleaner floating about the swimming pool surface so that the receptacle is submerged and the pellets are contacted with swimming pool water entering through the apertures. Chlorine solution is dispensed through the apertures directly into the pool water. The continuous, random motion of the swimming pool cleaner and the chlorinator effects a relatively even distribution of the chlorine solution into the body of water.

BACKGROUND OF THE INVENTION

To assure that swimming pools are safe and hygienic it is necessary to chlorinate the water. The prior art knows various manners of effecting such chlorination.

The most simple and inexpensive solution is to manually chlorinate the water. If regularly and conscientiously done, this is relatively satisfactory. However, manual chlorination of swimming pools is frequently forgotten or impossible so that this method of chlorination is not very satisfactory.

Automatic swimming pool chlorinators have therefore been devised and brought on the market which do not tax the users memory but which automatically discharge metered quantities of chlorine into the pool. Usually such chlorinators are connected with the swimming pool water circulating and cleaning mechanism. Typically such chlorinators store a quantity of chlorine crystals which are discharged, in metered amounts, into the pool water circulating flow, either continuously or periodically as, for example, when the circulating system is turned on and/or off.

Although such chlorinators dispense the required amount of chlorine into the pool water they are not as effective as might be desired since they usually discharge relatively large amounts of chlorine into the water at one time. Thus, the chlorine concentration in the water increases immediately upon the discharge of the chlorine into the water and can be at an undesirably high level which, thereafter, gradually breaks down until just prior to the next discharge cycle. At such time the chlorine might be undesirably low. Moreover, the chlorine is often concentrated in certain areas of the pool. Immediately following the discharge of the chlorine into the pool, the chlorine concentration in the vicinity of the pool water inlet is quite high. Furthermore, the geometry of the pool, water and air temperature conditions and resulting water currents, and the like can cause continued high chlorine concentration in some parts of the pool and low chlorine concentrations in other parts.

Moreover, prior art automatic chlorine dispensers of the type described above are relatively expensive to make and install and require separate space in the vicinity of the pool which might not be available. They are relatively large and unsightly and distract from the otherwise pleasing appearance of pools. Thus, prior art swimming pool chlorinators are less than fully satisfactory.

SUMMARY OF THE INVENTION

The invention provides a swimming pool chlorinator which is constructed for use with widely employed automatic swimming pool cleaners. Generally such pool cleaners float on and move randomly over the water surface and have a floating body, means such as intake hose connecting the body with a source of pressurized water and a first water nozzle mounted to the body for discharging a water jet and propelling the body over the water surface. A second water jet disposed above the water surface and hose means that move over the pool bottom maintain pool water contaminating particles suspended in the water for removal in the pool water filter.

The chlorinator of the invention is attached to the underside of the floating body and thus is submerged in the water and it moves with the pool cleaner so that it can discharge chlorine into the pool water while relatively evenly distributing it over the pool area. The chlorine is continuously dispensed at a low rate throughout the pool area so that heretofore troublesome chlorine concentrations during certain time periods and/or in certain portions of the pool are substantially eliminated.

The chlorinator of the present invention preferably comprises a cup-shaped receptacle having an opening defining a lower end of the chlorinator and a cover attached to the lower end for closing the opening. The cover includes aperture means permitting fluid communication between the interior of the closed receptacle and the exterior. Vent means are provided for the escape of air from the closed receptacle while it is in its submerged, operative position to permit the entrance of water into the receptacle through the aperture means. Means are further provided for attaching the receptacle in its operative position to the underside of the pool cleaner so that the chlorinator moves with the cleaner.

During operation, upon the immersion of the chlorinator in the pool, air in the receptacle is displaced by water which dissolves chlorine in the receptacle. The chlorine solution is slowly dispensed in relatively small amounts through the aperture means and distributed over the pool to effect an even pool water chlorination.

In the preferred embodiment of the invention the upper end of the receptacle includes an upwardly facing annular flange that has serrations that engage radially oriented ribs on the underside of the pool cleaner. Locking means such as a threaded bolt carried by the receptacle is tightened to prevent relative rotational movements of the receptacle about its threaded connection to the pool cleaner.

The chlorinator of the present invention is truly simple in comparison to prior art pool water chlorinators. Consequently, it is significantly less expensive to manufacture and its installation costs are nil since it is installed by merely threading it to the swimming pool cleaner. Moreover, it effects an even distribution of the chlorine both in terms of time and locale. Heretofore encountered relatively large variations in the chlorine content of the swimming pool water during the beginning and the end of a water filter cycle and chlorine concentrations in areas around the pool water inlet, particularly during start up of the filter mechanism, are eliminated by the present invention.

BRIEF DESCRIPTION OF THE DRAWINGS

FIG. 1 is a side elevational view, in section, through a swimming pool equipped with an automatic swimming pool cleaner to which a chlorinator is attached in accordance with the present invention;

FIG. 2 is a fragmentary, enlarged side elevational view, in section, through the chlorinator of the invention and it shows portions of the submerged underside of the pool cleaner;

FIG. 3 is a bottom end view of the chlorinator illustrated in FIG. 2; and

FIG. 4 is a fragmentary plane view of the chlorinator illustrated in FIG. 2 and shows, in phantom lines, the underside of the pool cleaner against which the chlorinator is tightened.

DESCRIPTION OF THE PREFERRED EMBODIMENTS

Referring first to FIG. 1, a swimming pool 6 is filled with water to a water level 8 and includes a floating pool cleaner 10 connected to a source of pressurized water 12 via connecting hose 14. The pool cleaner includes a first nozzle 16 which emits a water jet that propels the pool cleaner over the water surface. The cleaner is so constructed that the water jet causes the pool cleaner to move along edges of the pool as well as to circle around the pool.

The cleaner further includes a cleaning water nozzle 18 which discharges water against pool walls above the water surface and maintains such walls clean. A pair of free snaking hoses 20 and 22 depend from the pool cleaner and discharge pressurized water at the pool floor to keep contaminating particles suspended in the water for their subsequent removal in the filter system for the pool water. In accordance with the present invention a chlorinator 24 is attached to an underside 26 of the pool cleaner. Thus, the chlorinator is submerged in the pool water and moves with the cleaner over the pool surface for the slow, metered discharge of chlorine into the pool water.

Referring now to FIGS. 2 through 4, chlorinator 24 comprises a generally cylindrical, inverted receptacle 28 having its upper end defined by a flat transverse member 30 and having a downwardly facing opening 32. An axially oriented, upwardly extending annular flange 34 is defined on the exterior side of top member 30 and includes an end face 36 provided with circumferentially spaced serrations 38. The top member also includes an inwardly extending boss 40 provided with an outwardly opening bore 42 in which an internally threaded bushing 44 is anchored. A second boss 46 on top member 30 is aligned with annular flange 32, is through threaded, and receives a threaded bolt 48, the head of which is disposed interiorly of the receptacle.

A threaded stud 50 projects downwardly from underside 26 of pool cleaner 10 for engagement with threaded bushing 44. Receptacle 28 is tightened against the pool cleaner by rotating it on stud 50 until the serrations 38 on annular flange 34 engage ribs 52 which extend radially away from studs 50 on the underside of the pool cleaner. The annular flange is tightened against the ribs and thereafter threaded bolt 48 is turned until its upper end 54 is above lowermost end 56 of ribs 52. The portion of bolt 48 projecting above the lower rib end prevents rotation of the receptacle about the threaded bolt and a resulting loosening of the connection between the receptacle and the pool cleaner.

An external thread 58 is defined by the exterior of receptacle 28 adjacent its lower end 56. The external thread is engaged by a matching internal thread on upright walls 60 of a cover 62 placed across receptacle opening 32 and threadably secured to the receptacle to close the receptacle interior from the exterior. Cover 62 includes an inwardly facing boss 66 and a plurality of relatively small diameter, spaced apart apertures 64 which communicate the receptacle interior with the exterior.

In use, before receptacle 28 is tightened against and secured to underside 26 of pool cleaner 10, cover 62 is removed and conventional chlorine pellets 68 are placed on the interior of the receptacle. Thereafter, cover 62 is closed and the receptacle is secured to the pool cleaner.

Upon placement of the pool cleaner on the water surface chlorinator 24 becomes submerged and water enters through cover apertures 64 to contact pellets 68, dissolve them and thus form a chlorine solution that can be discharged into the swimming pool for chlorination thereof. To facilitate the filling of the receptacle with water, an air vent bore 70 is formed in top member 30 through which air escapes until the receptacle is filled with water.

With the actuation of the swimming pool cleaner, chlorinator 24 of the present invention is moved about the pool. Chlorine solution, which is slowly formed in the receptacle flows to the bottom of the receptacle, due to its greater specific gravity than water, and is then discharged into the swimming pool through cover apertures 64. Chlorine solution discharged from the receptacle interior is replaced by additional water entering through cover apertures 64 or vent aperture 70 for dissolving additional chlorine. Since the chlorinator is attached to the constantly moving pool cleaner, the chlorine solution discharged from the chlorinator is evenly distributed to substantially all points of the swimming pool. Moreover, the chlorination is continuous and in small amounts so that high chlorine concentrations encountered when relatively large quantities of chlorine are suddenly discharged into the pool are prevented.

The amount of chlorine discharged can be suitably adjusted by increasing or decreasing the size and/or diameter of cover aperture 64 and/or air vent 70. For a typical pool of average size, say of a size of about 30' x 15', a minimum depth of about 3' and a maximum depth of about 8', a receptacle having an inside diameter of about 4" and an overall inside height of about 4½" and filled with 3½ to 3¾ diameter chlorine pellets provides good and adequate chlorination with eight 3/16" diameter bores in cover 64. Air vent bore 70 has a diameter of 1/8". For greater pool sizes and/or pool depth, the number and/or diameter of the cover apertures can be suitably increased to obtain the desired chlorination rate.

I claim:

1. A combined pool cleaner-chlorinator comprising a pool cleaner including a float, means for supplying pressurized water to the pool cleaner, jet means for discharging pressurized water from the pool cleaner to thereby randomly propel the cleaner over the pool surface, a cup-shaped receptacle having an opening defining a lower end of the receptacle, a cover attached to the lower end for closing the opening and having aperture means permitting fluid communication between the interior of the closed receptacle and the exterior, vent means permitting the escape of air from the closed receptacle when it is submerged, to permit the entrance of water into the receptacle through the aperture means, and threaded means for attaching an upper end of the receptacle to an underside of the pool cleaner to move the chlorinator with the cleaner while the receptacle is submerged in the water, whereby the cleaner positively moves the receptacle through the water, water displaces air in the receptacle upon the immersion of the chlorinator, dissolves chlorine disposed in the receptacle and slowly dispenses relatively small amounts of dissolved chlorine through the aperture means to a multiplicity of points distributed over the pool area.

2. A chlorinator according to claim 1 wherein the securing means comprises means for threadably engaging the receptacle with the pool cleaner, and means for substantially immovably retaining the receptacle in a set position on the pool cleaner to prevent accidental disengagement between the two.

3. A chlorinator according to claim 2 for use with generally disc-shaped chlorine pellets and wherein the cover includes an inwardly facing projection for spacing a lowermost pellet from an inner side of the cover to maintain a free fluid communication between the closed receptacle interior and the exterior via the aperture means.

4. In a pool cleaner having a floating body, means connecting the body with a source of pressurized water, a first water nozzle mounted on the body for discharging a water jet, and thereby propelling the body over the water surface, a second water nozzle emitting a cleansing water jet above the water surface, and hose means for movement over the pool bottom, the improvement comprising a cup-shaped receptacle having an opening defining a lower end of the receptacle, a cover attached to the lower end for closing the opening and having aperture means permitting fluid communication between the interior of the closed receptacle and the interior, vent means permitting the escape of air from the closed receptacle when it is submerged to permit the entrance of water into the receptacle through the aperture means, and threaded means for attaching an upper end of the receptacle to an underside of the pool cleaner to move the chlorinator with the cleaner while the receptacle is submerged in the water, whereby the cleaner positively moves the receptacle through the water, water displaces air in the receptacle upon the immersion of the chlorinator, dissolves chlorine disposed in the receptacle and slowly dispenses relatively small amounts of dissolved chlorine through the aperture means to a multiplicity of points distributed over the pool area.

5. A swimming pool clorinator for use with a swimming pool cleaner propelled over the water surface and having a floating body terminating in a submerged bottom member having downwardly facing stiffening ribs positioned on the exterior of the member, the ribs extending generally away from a centrally located threaded bolt protruding from the bottom member to the exterior of the body, the chlorinator comprising: a downwardly opening housing including means adjacent an upper end of the housing for threadably engaging the threaded bolt, upwardly facing, annular flange means projecting from the housing for engaging the rib means and tightening the housing against the threaded bolt, and means for locking the housing to the body to prevent relative rotational movements between the housing and the body and to retain the housing on the threaded bolt, the housing also having a vent opening adjacent an uppermost point of the housing interior for the discharge of air and the like during immersion of the housing into the water, a cover placed across the downwardly facing open housing end for closing the housing interior and retaining solid chlorine to the housing interior, the cover including at least one aperture for passing water into the housing and discharging a chlorine solution from the housing interior into the pool water as the body and the chlorinator move about the pool, means securing the cover to the housing, and means spacing the solid chlorine from the vent opening and the cover opening to prevent the clogging of such openings and effect continuous operation of the chlorinator, whereby movement of the chlorinator while attached to the body through the pool water fills the housing interior not occupied by chlorine with water, dissolves chlorine in the water to form a chlorine solution and slowly discharges the solution through the cover aperture into the pool water while simultaneously distributing the discharged solution to assure a substantially uniform water chlorination.

6. Apparatus according to claim 5 wherein an upper end of the annular flange includes serrations to increase the friction between the body rib means and the flange to thus tighten the housing to the body.

7. Apparatus according to claim 6 wherein the locking means comprises a threaded bore extending in a generally vertical direction from the housing interior to the exterior, and a threaded bolt extending through the threaded bore into engagement with the exterior of the body bottom member to thereby prevent relative rotational movements between the housing and the body through engagement of the rib means.

References Cited
UNITED STATES PATENTS

| | | | |
|---|---|---|---|
| 3,291,145 | 12/1966 | Arneson | 15—1.7 |
| 3,426,901 | 2/1969 | Sherper | 23—267 E |
| 3,332,871 | 7/1967 | Robinson | 23—267 A |
| 3,598,536 | 8/1971 | Christensen | 23—267 A |
| 2,919,178 | 12/1959 | Fletcher | 23—267 A |
| 2,826,484 | 3/1958 | Buehler | 23—267 A |
| 2,148,180 | 2/1939 | Teigen | 23—267 A |
| 2,934,409 | 4/1960 | Biehl | 23—267 A |
| 3,483,989 | 12/1969 | Gokstein | 23—267 A |
| 3,616,923 | 11/1971 | Haley | 220—242 |
| 882,030 | 3/1908 | Traielsen | 220—242 |

NORMAN YUDKOFF, Primary Examiner

S. J. EMERY, Assistant Examiner

U.S. Cl. X.R.

15—1.7; 210—62, 169, 242